(12) United States Patent
Davis

(10) Patent No.: US 12,715,252 B2
(45) Date of Patent: Aug. 25, 2026

(54) TIRE CHANGING MACHINE AND METHOD FOR OPERATING TIRE CHANGING MACHINE

(71) Applicant: Hennessy Industries, Inc., LaVergne, TN (US)

(72) Inventor: Steven Davis, Woodbury, TN (US)

( * ) Notice: Subject to any disclaimer, the term of this patent is extended or adjusted under 35 U.S.C. 154(b) by 418 days.

(21) Appl. No.: 18/144,762

(22) Filed: May 8, 2023

(65) Prior Publication Data

US 2023/0382169 A1 Nov. 30, 2023

Related U.S. Application Data

(60) Provisional application No. 63/338,986, filed on May 6, 2022.

(51) Int. Cl.

*B60C 25/12* (2006.01)
*B60C 25/05* (2006.01)
*B60C 25/132* (2006.01)

(52) U.S. Cl.

CPC .......... *B60C 25/12* (2013.01); *B60C 25/0527* (2013.01); *B60C 25/132* (2013.01)

(58) Field of Classification Search

CPC . B60C 25/015; B60C 25/0527; B60C 25/125; B60C 25/12; B60C 258/132

USPC ............................... 157/1.28, 1.2; 403/109.1

See application file for complete search history.

(56) References Cited

U.S. PATENT DOCUMENTS 1,329,849 A * 2/1920 Pierson .................. B29C 37/02 409/165
1,466,964 A * 9/1923 Sall ...................... B60C 25/142 157/1.46
1,839,951 A * 1/1932 Choinski ................ B60C 25/02 157/1
2,470,107 A * 5/1949 Piacenti ................ B60C 25/025 157/1.2
2,615,506 A * 10/1952 Wilson .................. B60C 25/132 157/1.2
2,816,602 A * 12/1957 Swarthout .............. B60C 25/14 157/1.21
3,052,447 A * 9/1962 Mishler ................. B60C 25/142 254/50.2
3,493,029 A * 2/1970 Kimball ................ B60C 25/132 157/1.2
3,500,891 A * 3/1970 Collins .................. B60C 25/14 157/1.42
3,850,221 A * 11/1974 Zrostlik ................ B60C 25/142 157/1.33
5,623,981 A 4/1997 Cunningham et al.
5,752,555 A 5/1998 Cunningham
5,941,294 A 8/1999 Cunningham et al.
(Continued)

*Primary Examiner* — Bryan R Muller

(74) *Attorney, Agent, or Firm* — Patterson Intellectual Property Law, P.C.; Ryan D. Levy

(57) ABSTRACT

A tire changing machine of the present disclosure may comprises a chassis base, a rotatable wheel holder, a tower, and an arm. A linear actuator is attached to the tower via a pivoting arm assembly. The linear actuator includes an implement on a lower end of the linear actuator. The arm includes an elongate portion, a coupler, first and second ends, first and second halves, and first and second claws. The coupler is located at a central portion of the elongate portion and is operable to couple the arm to the implement of the linear actuator. The first and second claw are operable to engage a tread portion of a tire.

10 Claims, 15 Drawing Sheets

(56) References Cited

U.S. PATENT DOCUMENTS

| | | | |
|---|---|---|---|
| 6,039,104 | A | 3/2000 | Cunningham et al. |
| 6,044,888 | A | 4/2000 | Cunningham et al. |
| 6,056,034 | A | 5/2000 | Matnick |
| 6,062,289 | A | 5/2000 | Cunningham et al. |
| 6,182,736 | B1 | 2/2001 | Cunningham et al. |
| 6,786,267 | B1 * | 9/2004 | Warren .................. B60C 25/13 157/1.2 |
| 6,863,110 | B1 | 3/2005 | Cunningham |
| 7,438,109 | B2 | 10/2008 | Cunningham |
| 7,543,622 | B1 | 6/2009 | Carpenter et al. |
| 7,793,699 | B2 * | 9/2010 | Vanhouten ............ B60C 25/025 157/2 |
| 7,882,882 | B2 | 2/2011 | Cunningham |
| 7,987,889 | B1 | 8/2011 | Story |
| 8,196,637 | B1 | 6/2012 | Story |
| 8,215,367 | B1 | 7/2012 | Story |
| 8,225,838 | B1 | 7/2012 | Story |
| 8,333,228 | B1 | 12/2012 | Cunningham |
| 8,347,934 | B1 | 1/2013 | Cunningham |
| 8,443,865 | B2 | 5/2013 | Story |
| 2021/0114408 | A1 * | 4/2021 | Darolfi .................. B60B 29/008 |

* cited by examiner

TIRE CHANGING MACHINE AND METHOD FOR OPERATING TIRE CHANGING MACHINE

CROSS-REFERENCES TO RELATED APPLICATIONS

This application claims benefit of the following patent application which is hereby incorporated by reference: U.S. Provisional Application No. 63/338,986 filed May 6, 2022, entitled "System and Method for Improved Tire to Rim Sealing."

BACKGROUND

1. Field of the Invention

The present invention relates generally to tire changing machines and, more particularly, to a tire changing machine and method for operating the tire changing machine that promotes improved sealing of a tire to a wheel.

2. Description of the Prior Art

Tire changers are utilized by employees of vehicle service centers when it is necessary to remove a tire from its wheel and replace it with a new one. After the tire is replaced, the wheel is inflated by the operator. A tire-changing procedure utilizing a conventional tire changing machine may involve the following steps: (1) providing a tire-wheel assembly and loosening the seal between the tire's bead and a lip of the wheel, (2) placing the tire-wheel assembly on a rotatable wheel holder of the tire changing machine, (3) securing the wheel to the rotatable wheel holder, (4) removing the tire from the wheel using a mount/dismount head, (5) placing a new tire at least partially over the wheel, (6) mounting the tire on the wheel using the mount/dismount head to force the bead of the tire over the lip of the wheel, and (7) sealing the tire's bead into the lip of the wheel, and (8) inflating the new tire.

Sealing the bead of the tire into the lip of the wheel can be done several ways. In one such way, the rotatable wheel holder may include a plurality of nozzles operable to expel a blast of air. The tire changer may also include a valve stem inflation hose operable to couple to a valve stem of the tire. To seal the bead of the tire into the lip of the wheel, the wheel is secured to the rotatable wheel holder and the tire is mounted loosely around the wheel. The valve stem inflation hose is coupled to the valve stem of the tire. The valve stem inflation hose continuously expels air into an interior chamber of the tire. The plurality of nozzles expel a blast of air toward a lower lip of the wheel. For typical wheel-tire assemblies, this system may be successful in sealing the bead of the tire into the lip of the wheel.

However, sealing the bead of the tire into the lip of the wheel in some tire-wheel assemblies may be difficult. For difficult to seal tire-wheel assemblies, other systems and methods are often utilized. One such method involves the use of multiple human operators. One of the human operators may lift the tire such that it is generally halfway between the upper lip and lower lip of the wheel. Needing more than a single human operator presents an ergonomic issue. Further, the human operator must hold the tire during the sealing process, thus placing the human operator, namely the operator's hands and fingers, in an unsafe position. In another method, auxiliary air devices may be utilized because, due to air restrictions, the plurality of jets on the rotatable wheel holder may not deliver the air volume needed to seal the tire to the wheel. One such auxiliary air device that may be used is a handheld bead blasting air tank. Providing additional human operators and auxiliary tools adds to the time and cost needed to seal the bead of the tire into the lip of the wheel.

BRIEF SUMMARY

Accordingly, there is a need for a new tire changing machine configured to seal the bead of a tire into the lip of a wheel on various tire-wheel assemblies, including difficult to seal assemblies, without the use of additional human operators or auxiliary air devices.

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

One aspect in accordance with the embodiments disclosed herein is a tire changing machine. The tire changing machine comprises a chassis base, a rotatable wheel holder, a tower, and an arm. The rotatable wheel holder is operable to retain a wheel rim. The tower extends upward from the chassis base. A linear actuator is attached to the tower via a pivoting arm assembly. The linear actuator includes an implement on a lower end of the linear actuator. The arm includes an elongate portion, a coupler, first and second ends, first and second halves, and first and second claws. The coupler is located at a central portion of the elongate portion and is operable to couple the arm to the implement of the linear actuator. The first half of the arm extends from the central portion to the first end. The second half of the arm extends from the central portion to the second end. The first claw is coupled to the first half of the arm and the second claw is coupled to the second half of the arm. The first and second claw are operable to engage a tread portion of a tire.

In certain embodiments in accordance with this aspect, the elongate portion of the arm comprises a cylinder with a threaded exterior surface. Each of the first and second claw have an aperture operable to receive and engage the threaded exterior surface of the cylinder. The first and second claw are operable to move towards the central portion of the arm when the cylinder is rotated in a first direction. The first and second claw are operable to move away from the central portion of the arm when the cylinder is rotated in a second direction.

In certain embodiments in accordance with this aspect, the elongate portion of the arm comprises a telescopic elongate portion and the first and second ends are spring biased toward the central portion of the arm.

In certain embodiments in accordance with this aspect, the elongate portion comprises a telescopic elongate portion having a center member, a first outer member, and a second outer member. The first outer member is configured to receive the center member and includes gear teeth. The second outer member is configured to receive the first outer member and includes gear teeth. The coupler is connected to the center member and comprises a handle and first and second gears that are rotatably coupled to the handle. The first gear is operable to engage the gear teeth of the first outer member and the second gear is operable to engage the gear teeth of the second outer member.

In certain embodiments in accordance with this aspect, at least one of the first and second claws includes a lock operable to lock the claw relative to the elongate portion of the arm.

In certain embodiments in accordance with this aspect, the coupler forms a looped handle extending away from the arm and operable to receive the implement of the linear actuator.

In certain embodiments in accordance with this aspect, the linear actuator comprises a hydraulic cylinder.

In certain embodiments in accordance with this aspect, the linear actuator comprises an electrically powered linear actuator.

In certain embodiments in accordance with this aspect, each of the first and second claws include an attachment portion operable to couple the claw to the elongate portion of the arm, an extension portion coupled to the attachment portion and oriented substantially perpendicular to the elongate portion of the arm, and a grip portion coupled to the extension portion and operable to engage the tread portion of the tire.

In certain embodiments in accordance with this aspect, the grip portion includes a tire engagement edge having a curvature with a circumference similar to a circumference of the tread portion of the tire.

Another aspect in accordance with the embodiments disclosed herein is a tire changing tool comprising an elongate portion, a first claw, and a second claw. The elongate portion includes a central portion, a first end, a second end, a first half extending from the central portion to the first end, a second half extending from the central portion to the second end. The first claw is coupled to the first half of the arm and the second claw is coupled to the second half of the arm. The first and second claws are operable to engage a tread portion of a tire.

In certain embodiments in accordance with this aspect, the elongate portion of the arm comprises a cylinder with a threaded exterior surface. Each of the first and second claws have an aperture operable to receive and engage the threaded exterior surface of the cylinder. The first and second claws are operable to move towards the central portion of the arm when the cylinder is rotated in a first direction. The first and second claws are operable to move away from the central portion of the arm when the cylinder is rotated in a second direction.

In certain embodiments in accordance with this aspect, the elongate portion of the arm comprises a telescopic elongate portion and the first and second ends are spring biased toward the central portion of the arm.

In certain embodiments in accordance with this aspect, the elongate portion comprises a telescopic elongate portion having a center member, a first outer member, and a second outer member. The first outer member is configured to receive the center member and includes gear teeth. The second outer member is configured to receive the first outer member and includes gear teeth. The tire changing machine further includes a coupler connected to the center member. The coupler comprises a handle and first and second gears. The first and second gears are rotatably coupled to the handle. The first gear is operable to engage the gear teeth of the first outer member and the second gear is operable to engage the gear teeth of the second outer member.

In certain embodiments in accordance with this aspect, at least one of the first and second claws includes a lock operable to fix the claw relative to the elongate portion of the arm.

In certain embodiments in accordance with this aspect, each of the first and second claws includes an attachment portion, an extension portion, and a grip portion. The attachment portion is operable to couple the claw to the elongate portion of the arm. The extension portion is coupled to the attachment portion and oriented substantially perpendicular to the elongate portion of the arm. The grip portion is coupled to the extension portion and operable to engage the tread portion of the tire.

In certain embodiments in accordance with this aspect, the grip portion includes a tire engagement edge having a curvature with a circumference similar to a circumference of the tread portion of the tire.

Another aspect in accordance with the embodiments disclosed herein is a method of sealing a tire bead into a lip of a wheel. The method comprises providing a tire changing machine having a chassis base, a rotatable wheel holder operable to retain a wheel, a tower including a linear actuator having an implement on a lower end of the linear actuator, and an arm including an elongate portion, a coupler at a central portion of the elongate portion operable to couple the arm to the implement of the linear actuator, and first and second claws coupled to the elongate portion of the arm and operable to engage a tread portion of a tire. The method further comprises providing a tire-wheel assembly comprising a tire loosely mounted to a wheel. The method further comprises positioning the tire-wheel assembly on the rotatable wheel holder. The method further comprises engaging the tread portion of the tire with the first and second claws. The method further comprises supporting the tire at the tread portion with the first and second claws. The method further comprises directing air between the lip of the wheel and the tire.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof. Furthermore, any part of the apparatus of the present disclosure may be made using any applicable manufacturing method, such as, but not limited to 3D printing, injection molding, or the like.

Figure 1:
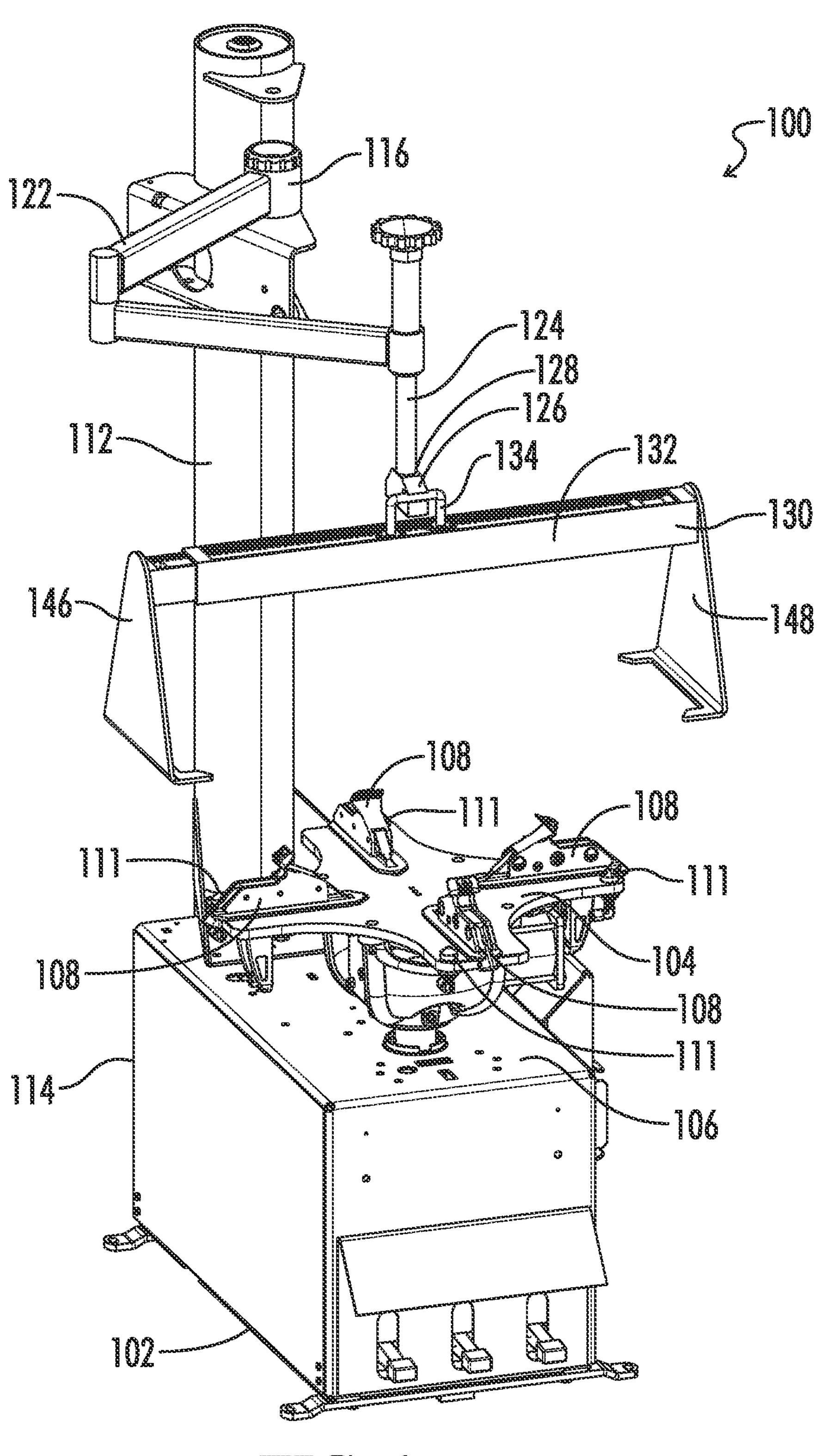
FIG. 1 is a perspective view of a tire changing machine in accordance with the present disclosure.

Referring now to FIG. 1, in order to provide an improved system and method for tire to wheel sealing, and to overcome the disadvantages and inefficiencies discussed in the Description of the Prior Art, disclosed herein is a new and novel tire changing machine, generally designated by the number 100. The tire changing machine is configured to at least mount and seal a tire 10 to a wheel 50.

Figure 2A:
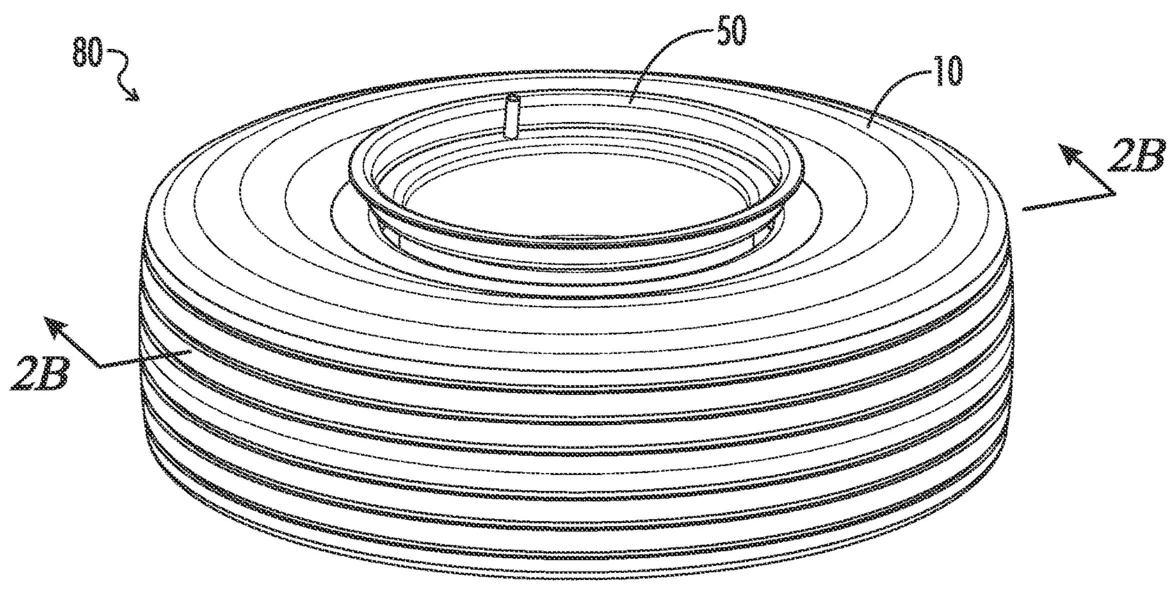
FIG. 2A is a perspective view of a tire-wheel assembly in accordance with the present disclosure.
Figure 2B:
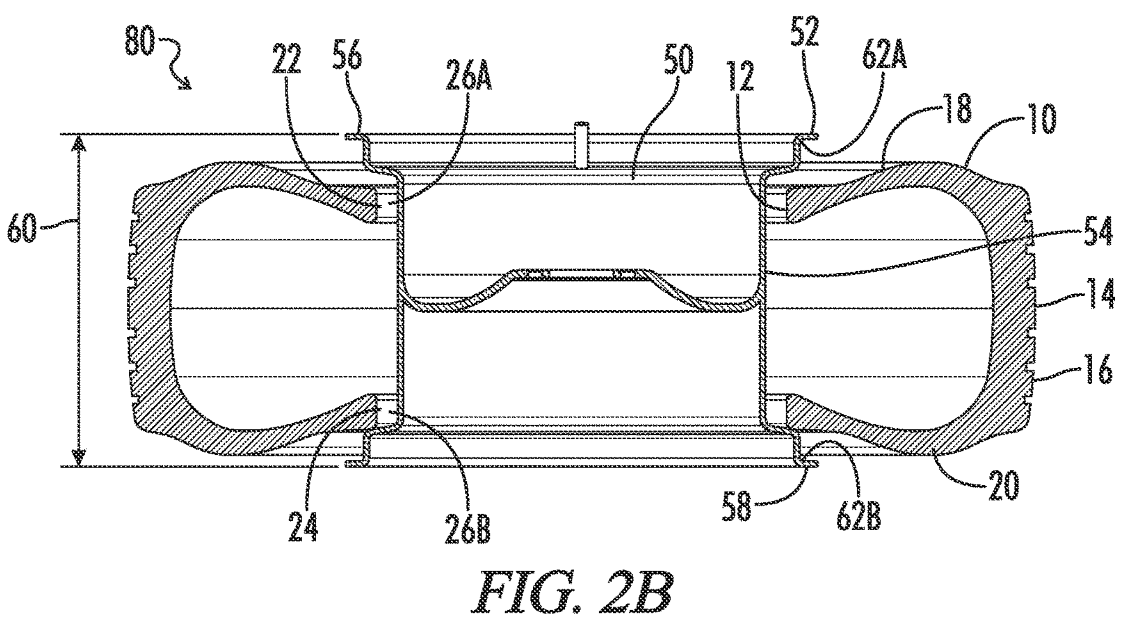
FIG. 2B is a cross-sectional view of the tire-wheel assembly of FIG. 2A taken along line 2B-2B of FIG. 2A.

Referring now to FIGS. 2A-2B, the tire 10 includes an inner circumference 12 and an outer circumference 14. A tread portion 16 is located along the outer circumference 14 of the tire. The outer circumference 14 may also be referred to as a tread portion circumference 14. A first sidewall 18 and a second sidewall 20 extend from the tread portion to the inner circumference 14. The first sidewall 18 includes a first inner edge 22 extending along the inner circumference 12 of the tire 10. The second sidewall 20 includes a second inner edge 24 extending along the inner circumference 12 of the tire 10. One of skill in the art will recognize that first and second sidewalls 18,20 are virtually identical. The designation of "first" and "second" are simply used for clarity. The first and second inner edge 22,24 include a first and second bead 26A,26B, respectively. The bead of the tire 10 may generally be designated by the number 26.

The wheel 50 includes an outer wheel circumference 52 and an inner wheel circumference 54. A first wheel edge 56 and a second wheel edge 58 extend along the outer wheel circumference 52. A wheel width 60 is generally defined as the distance between the first and second wheel edges 56,58. The first wheel edge 56 includes a first lip 62A and the second wheel edge 58 includes a second lip 62B. The first and second lip 62A,62B are operable to receive either of the first or second beads 26A,26B of the tire 10. The lip of the wheel 50 may generally be designated by the number 62.

A combination of the tire 10 and the wheel 50 may be referred to as a tire-wheel assembly 80. The tire-wheel assembly 80 may exist in an unmounted configuration wherein the first and second inner edges 22, 24 of the tire 10 are not entirely between the first and second wheel edges 56,58. The tire 10 may be completely separated from the wheel 50 in the unmounted configuration. Alternatively, only one of the first or second inner edges 22, 24 of the tire 10 may be between the first and second wheel edges 56,58 in the unmounted configuration. Thus, the unmounted configuration is used to refer to any configuration in which the tire 10 is not mounted on the wheel 50.

The tire-wheel assembly 80 may exist in a mounted configuration wherein the first and second inner edges 22,24 of the tire 10 are entirely between the first and second wheel edges 56,68. However, in the mounted configuration, the beads 26 of the tire 10 are not sealed in the lips 62 of the wheel 50. The tire wheel assembly 80 is shown in the mounted configuration in FIGS. 2A-2B.

The tire-wheel assembly 80 may be in a sealed configuration wherein the beads 26 of the tire 10 are sealed into the lips 62 of the wheel 50. When the beads 26 are sealed within the lips 62, the beads 26 may also be referred to as being sealed. Typically, bead sealer is applied to the beads 26 of the tire 10 to adhere the bead 26 to the lip 62 of the wheel 50. Bead sealer may be a natural rubber based compound that is dissolved in solvent. Bead sealer is configured to maintain an air-tight seal between the bead 26 of the tire 10 and the lip 62 of the rim 50 and prevent separation. The tire-wheel assembly 80 is shown in the sealed configuration in FIGS. 11A-11B.

Figure 3:
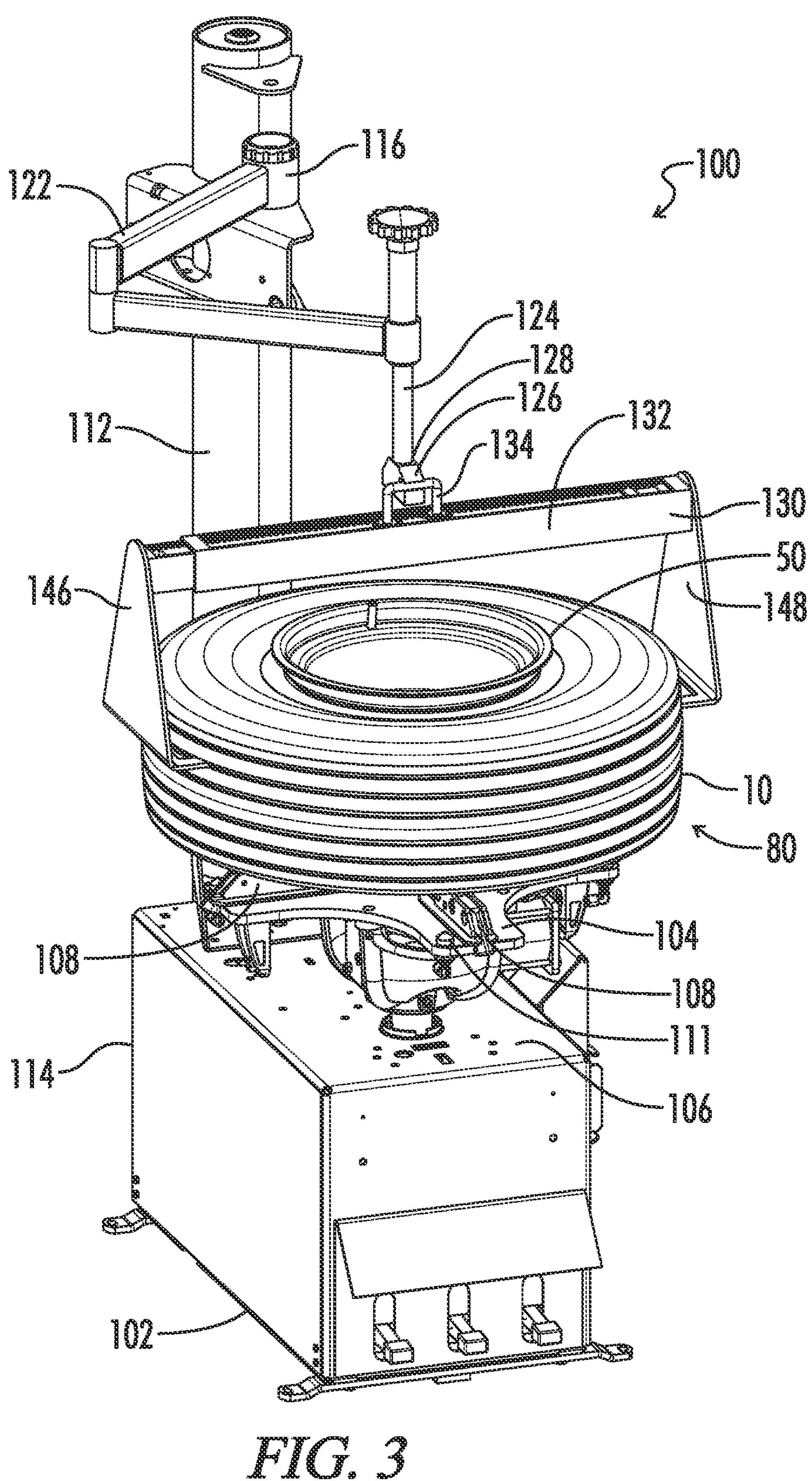
FIG. 3 is a perspective view of the tire changing machine of FIG. 1 and the tire-wheel assembly of FIG. 2A.

Referring now to FIGS. 1 and 3, the tire changing machine 100 includes a chassis base 102 in which a plurality of internal mechanisms may be located. A rotatable wheel holder, here in the form of a turntable 104, is located above a top 106 of the chassis base 102 for supporting the wheel 50 in a horizontal position for tire mounting and demounting. A pneumatic motor may be located inside of chassis base 102 and operable to rotate the turntable 104.

Turntable 104 may include a plurality of jaws 108 that move radially into and out of engagement with the wheel 50. A series of foot pedals may be provided at the front of chassis base 102 for use by a human operator. The foot pedals may perform various functions, such as controlling rotation of turntable 104 and movement of jaws 108. The tire changing machine 100 may further include a plurality of nozzles 111 operable to expel a blast of air. The tire changer may also include a valve stem inflation hose 113, shown in FIG. 10B, operable to couple to a valve stem of the tire 10 and expel air.

A vertical tower 112 extends up from a back 114 of chassis base 102. A mount/demount assembly may be located at an upper end of the tower 112. Assembly 116 includes a pivoting arm assembly 122 having a linear actuator 124 at its distal end. The linear actuator 124 may be a hydraulic cylinder, an electrically powered linear actuator, or the like. The linear actuator 124 includes an implement 126 at a lower end 128 of the linear actuator 124. The implement 126 may perform a plurality of functions, such as pushing the inner edges 22,24 of the tire 10 over the wheel edges 56,58 when mounting the tire 10 to the wheel 50.

One of skill in the art will recognize that the tire changing machine 100 may have more than one pivoting arm assembly to provide for more tools. A second pivoting arm assembly may carry a moveable toolhead at its distal end. As a result, the toolhead may be moved from a position away from the wheel 50 to a position adjacent to the wheel 50 when the wheel 50 is secured to the turntable 104. The toolhead may also be referred to as a mount/demount head. The mount/demount head may be operable to push the bead 26 of the tire 10 over the lip 62 of the wheel 50 when the tire 10 is being mounted to the wheel 50 or removed from the wheel 50. Further, while the pivoting arm assembly 122 is shown including two arm segments, the pivoting arm assembly 122 may include less than or more than two arm segments.

The tire changing machine 100 further comprises an arm 130. The arm 130 may also be referred to as a sealing extra assist lift (SEAL) 130. Referring now to FIGS. 4A-7B, the arm 130 includes an elongate portion 132. The arm further includes a coupler 134 at a central portion 136 of the elongate portion 132. One of skill in the art will recognize that the central portion 136 may be at the center of the elongate portion 132, or may be off-center of the elongate portion 132. The coupler 134 may form a looped handle extending away from the arm 130 and be operable to receive the implement 126 of the linear actuator 124. The coupler 134 may be configured to accept a variety of implements that may be present on alternative embodiments of the tire changing machine 100. Thus, the arm 130 is operable with a variety of tire changing machine 100 brands and models.

The arm 130 further includes a first end 138, a second end 140, a first half 142 extending from the central portion 136 to the first end 138, and a second half 144 extending from the central portion 136 to the second end 140. The arm 130 further includes a first claw 146 coupled to the first half 142 of the arm 130 and a second claw 148 coupled to the second half 144 of the arm 130.

The first and second claws 146,148 include an attachment portion 150, an extension portion 152, and a grip portion 154. The attachment portion 150 is operable to couple the claw to the elongate portion of the arm. The extension portion 152 is coupled to the attachment portion 150 and oriented substantially perpendicular to the elongate portion 132 of the arm 130. One of skill in the art will recognize that the extension portion 152 may be perpendicular to the elongate portion 132, as shown in FIGS. 4A-7B, or at an angle relative to the elongate portion 152 such that the extension portion 152 is not perpendicular. The grip portion 154 is coupled to the extension portion 152 and operable to engage the tread portion 16 of the tire 10. The grip portion 154 may include a tire engagement edge 156. The grip portion 154 may have a curvature with a circumference similar to the tread portion circumference 14 of the tire 10. One of skill in the art will recognize that tires 10 have varying tread portion circumferences 14. Thus, the curvature of the tire engagement edge 156 may generally have a circumference similar to the tread portion circumference 14, but the curvature may not exactly match for all sizes of tires 10. The grip portion 154 may further be operable to fit within a recessed portion of the tread portion 16 of the tire 10 such that the grip portion 154 provides vertical support to the tire 10.

In an alternative embodiment of the arm 130, the arm 130 includes three or more claws to provide additional grip and support to the tire 10. The arm 130 may also include more than one elongate member 132 to support the additional grips. Furthermore, the tire changing machine 100 may include a plurality arms 130 to engage the tire 10.

In an alternative embodiment of the tire changing machine 100, the arm 130 may be coupled to the tower 112 by the second pivoting arm assembly. Alternatively, the tire changing machine 100 may include a second chassis base that is separate from chassis base 102. The arm 130 may be mounted to and supported by the second chassis base 159.

Figures 4A, 4B:
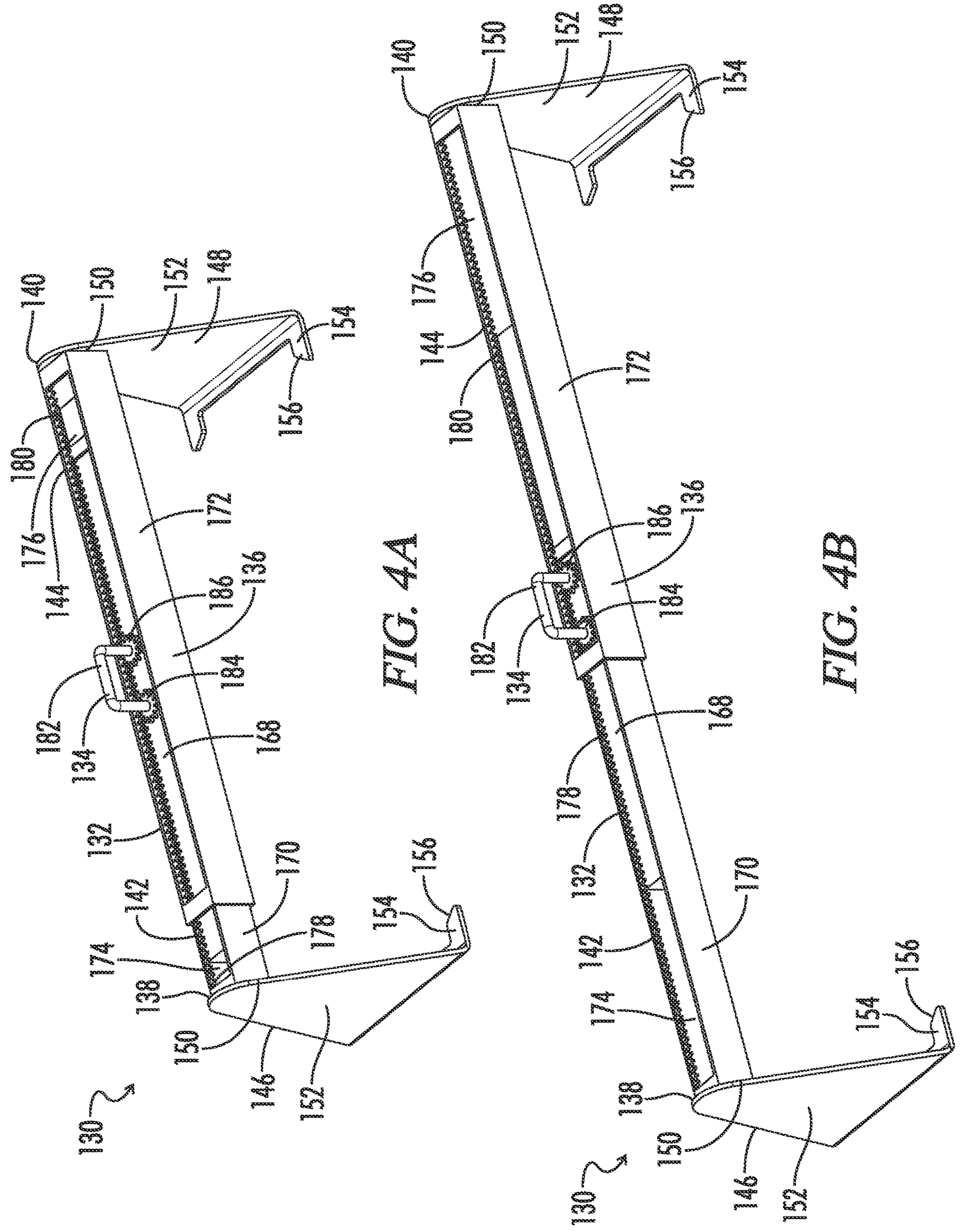
FIG. 4A is a perspective view of an embodiment of an arm of the tire changing machine of FIG. 1.
FIG. 4B is a perspective view of the embodiment of the arm of FIG. 4A.
Figure 4C:
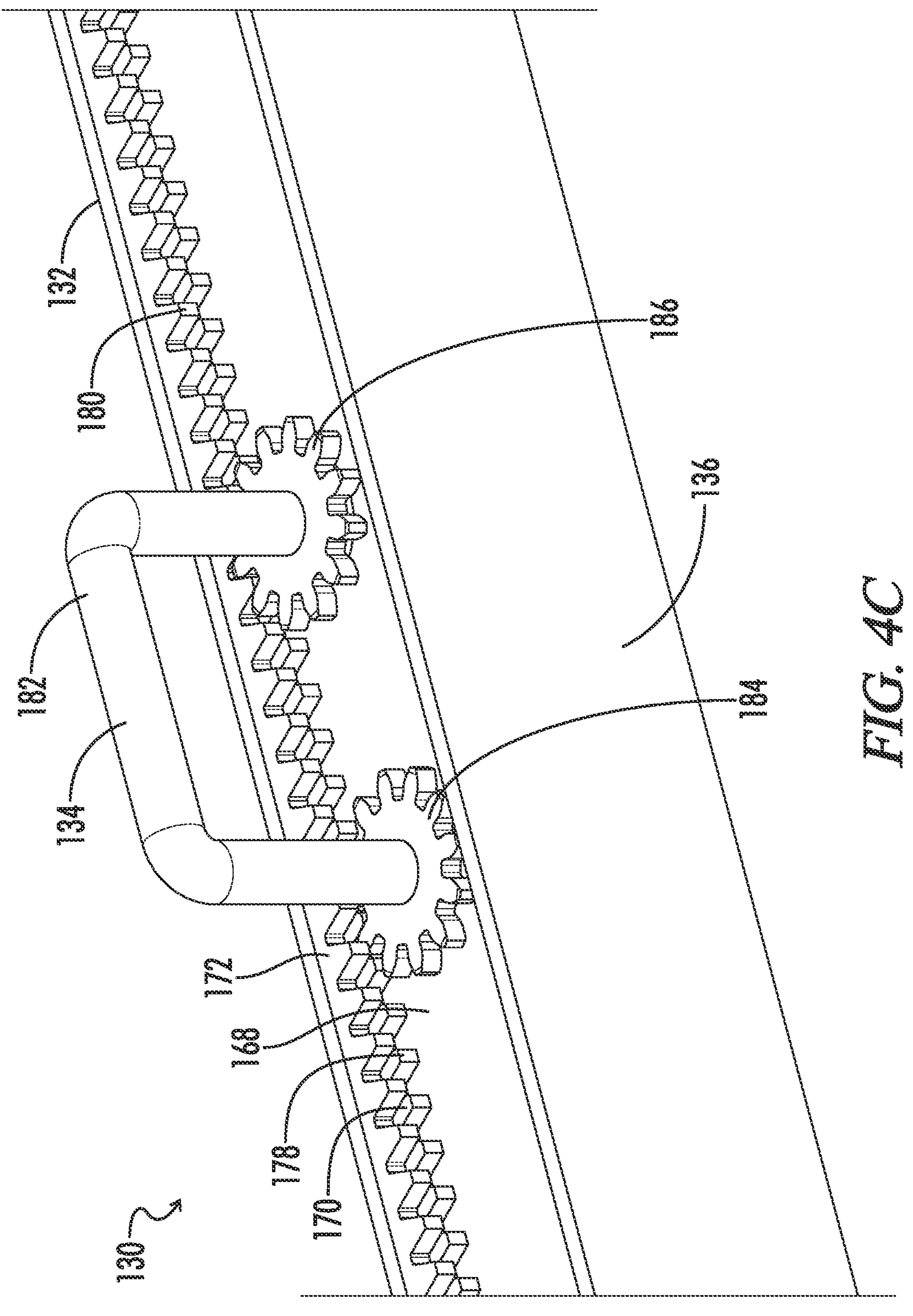
FIG. 4C is a partial perspective view of the embodiment of the arm of FIG. 4A.

One embodiment of the arm 130 is shown in FIGS. 4A-4C. The elongate portion 132 comprises a telescopic elongate portion having a center member 168, a first outer member 170, and a second outer member 172. The first outer member 170 is configured to receive the center member 168. The second outer member 172 is configured to receive the first outer member 170 in addition to the center member 168. The first outer member 170 may include a recess 174 in a top of the first outer member 170. The second outer member 172 may include a recess 176 in a top of the second outer member 172. The first outer member 170 may include gear teeth 178 located along an edge of recess 174. The second outer member 172 may include gear teeth 180 located along an edge of recess 176. As shown in FIG. 4C, gear teeth 178 and gear teeth 180 are positioned substantially parallel to one another. The coupler 134 is fixed to the center member 168 and comprises a handle 182, a first gear 184, and a second gear 186. Recesses 174,176 allow the first outer member 170 and second outer member 172 to translate relative to the center member 168 without contacting the coupler 134. The first and second gears 184,186 are rotatably coupled to the handle 182. The first gear 184 is operable to engage gear teeth 178 of the first outer member 170 and the second gear 186 is operable to engage gear teeth 180 of the second outer member 172. Thus, the first and second gears 184,186 and the first and second gear teeth 178,180 operate in a rack and pinion manner. The first claw 146 and the first outer member 170 are operable to translate relative to the center member 168. The second claw 148 and the second outer member 172 are operable to translate relative to the center member 168. The first claw 146 and first outer member 170 and the second claw 148 and second outer member 172 can be translated simultaneously or independently.

Figures 5A, 5B:
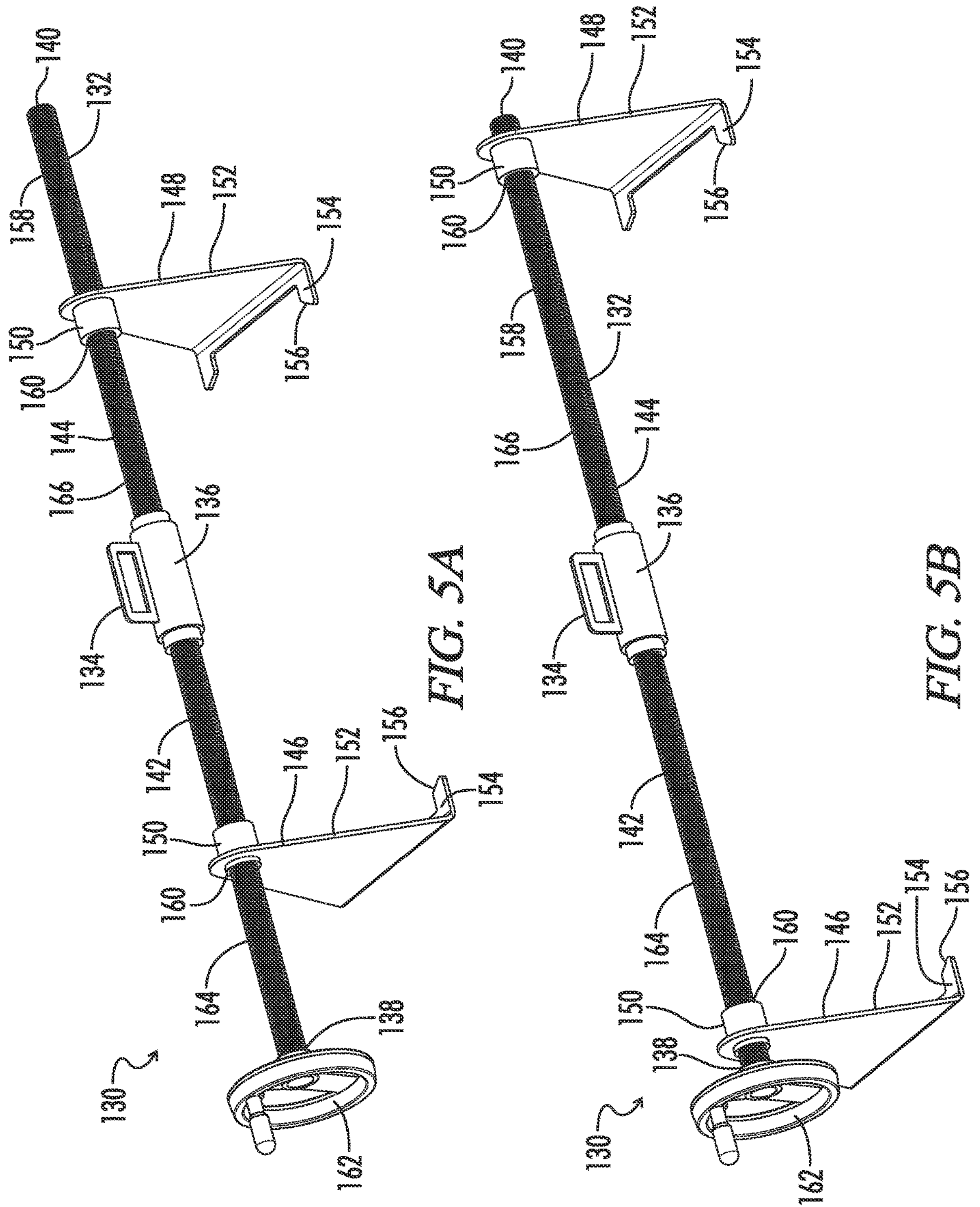
FIG. 5A is a perspective view of an alternative embodiment of the arm of the tire changing machine of FIG. 1.
FIG. 5B is a perspective view of the alternative embodiment of the arm of FIG. 5A.

Another embodiment of the arm 130 is shown in FIGS. 5A-5B. The elongate portion 132 of the arm 130 comprises a cylinder 158 with a threaded exterior surface. The attachment portion 150 of each of the first and second claws 146,148 includes an aperture 160. The aperture 160 is operable to receive and engage the threaded exterior surface of the cylinder 158. The aperture 160 may include a threaded interior surface. The arm 130 further includes a wheel 162 fixed to the cylinder 158. The wheel 162 is configured to be rotated by the human operator, thus rotating the cylinder 158. The threaded exterior surface of the cylinder 158 includes a first set of threads 164 located on the first half 142 of the arm 130 and a second set of threads 166 located on the second half 144 of the arm 130. A direction of the first set of threads 164 may be opposite a direction of the second set of threads 166. The cylinder 158 may be comprised of a single piece having the first and second set of threads 164,166 located thereon. Alternatively, the cylinder 158 may be comprised of a plurality of pieces with the first set of threads 164 located on a different piece than the second set of threads 166. The first and second claws 146,148 are operable to move towards the central portion 136 of the arm 130 when the cylinder 158 is rotated in a first direction and away from the central portion 136 of the arm 130 when the cylinder 158 is rotated in a second direction. The central portion 136 may be configured to maintain the coupler 134 in an upright position while the cylinder 158 is being rotated.

Figures 6A, 6B, 7A, 7B:
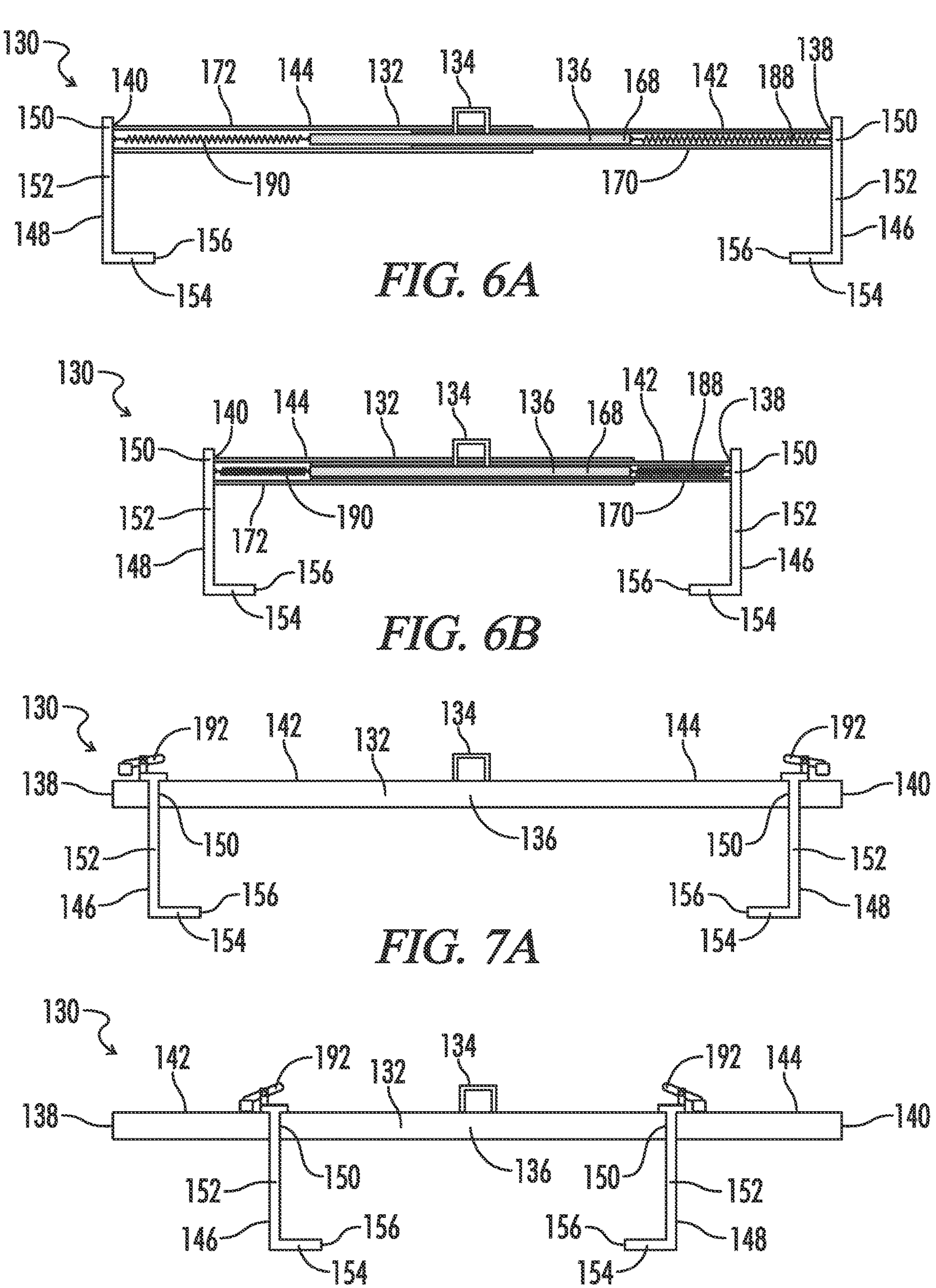
FIG. 6A is a schematic view of an alternative embodiment of the arm of the tire changing machine of FIG. 1.
FIG. 6B is a schematic view of the alternative embodiment of the arm of FIG. 6A.
FIG. 7A is a schematic view of an alternative embodiment of the arm of the tire changing machine of FIG. 1.
FIG. 7B is a schematic view of the alternative embodiment of the arm of FIG. 7A.

Another embodiment of the arm 130 is shown in FIGS. 6A-6B. The elongate portion 132 comprises the telescopic elongate portion having center member 168, first outer member 170, and second outer member 172. The first outer member 170 is configured to receive the center member 168. The second outer member 172 is configured to receive the first outer member 170 in addition to the center member 168. The first outer member 170 may include recess 174 in the top of the first outer member 170. The second outer member 172 may include recess 176 in the top of the second outer member 172. The coupler 134 is fixed to the center member 168. A first spring 188 is coupled at a first end to the first outer member 170 and at a second end to the center member 168. A second spring 190 is coupled at a first end to the second outer member 172 and at a second end to the center member 168. The first and second outer members 170,172, and thus the first and second ends 138,140 of the arm 130, are spring biased toward the central portion 136 of the arm 130. The first claw 146 and the first outer member 170 are operable to translate relative to the center member 168. The second claw 148 and the second outer member 172 are operable to translate relative to the center member 168. The first claw 146 and first outer member 170 and the second claw 148 and second outer member 172 can be translated simultaneously or independently.

Another embodiment of the arm 130 is shown in FIGS. 7A-7B. At least one of the first and second claws 146,148 are configured to translate along the elongate portion 132 of the arm 130. Thus, both the first and second claws 146,148 may be translatable, or one of the first and second claws 146,148 may be fixed while the other claw is translatable. At least one of the first and second claws 146,148 includes a lock 192 operable to lock the claw relative to the elongate portion 132 of the arm 130. The lock 192 may be a pivoting lock as shown in FIGS. 7A-7B. Alternatively, the lock 192 may be any lock that prevents the claw from translating relative to the elongate portion 132 of the arm 130.

The tire changing machine 100 is configured to at least mount and seal the tire 10 to the wheel 50. The wheel 50 is secured to the turntable 104 and the tire 10 is mounted to the wheel 50. When the tire-wheel assembly 80 is in the mounted configuration, the first and second inner edges 22,24 of the tire 10 are entirely between the first and second wheel edges 56,68. However, in the mounted configuration, the beads 26 of the tire 10 are not sealed in the lips 62 of the wheel 50. Thus, the tire 10 is free to move between the first and second wheel edges 56,58. Moreover, the tire 10 will not hold air or inflate when in the mounted configuration because the beads 26 of the tire 10 are not sealed in the lips 62 of the wheel 50.

To seal the bead 26 of the tire 10 into the lip 62 of the wheel 50, the tire-wheel assembly 80 is secured to the turntable 104 and the tire wheel assembly 80 is placed in the mounted configuration. The valve stem inflation hose 113 is coupled to the valve stem of the tire 10. The valve stem inflation hose 113 continuously expels air into an interior chamber of the tire 10. The human operator then causes the plurality of nozzles 111 to expel a blast of air. The plurality of nozzles 111 direct the blast of air between the bead 26 of the tire 10 and the lip 62 of the wheel. In reference to the position of the tire-wheel assembly 80 in FIG. 8A-11B, the plurality of nozzles 111 direct the blast of air between the second inner edge 24, and thus the second bead 26B, of the tire 10 and the second wheel edge 58, and thus the second lip 62B, of the wheel 50. If the bead 26 will not seal into the lip 62, an auxiliary device may be utilized which provides a blast of air between the first inner edge 22, and thus the first bead 26A, of the tire 10 and the first wheel edge 56, and thus the first lip 62A, of the wheel 50. The blast of air from the auxiliary device is often delivered simultaneously to the plurality of nozzles 111 expelling a blast of air.

Figure 8A:
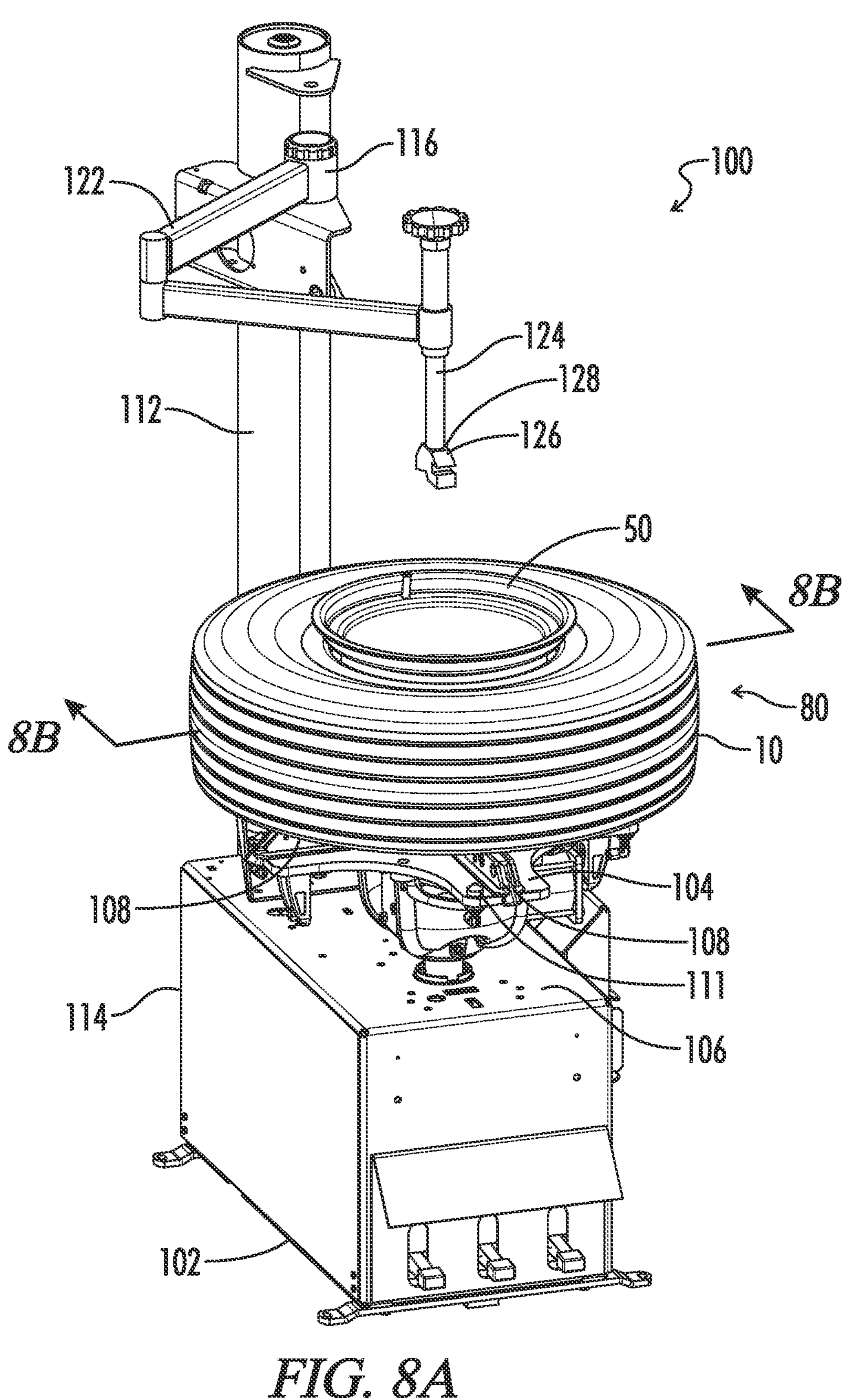
FIG. 8A is a perspective view of the tire changing machine of FIG. 1 with the arm removed and the tire changing machine supporting the tire-wheel assembly of FIG. 2A.
Figure 8B:
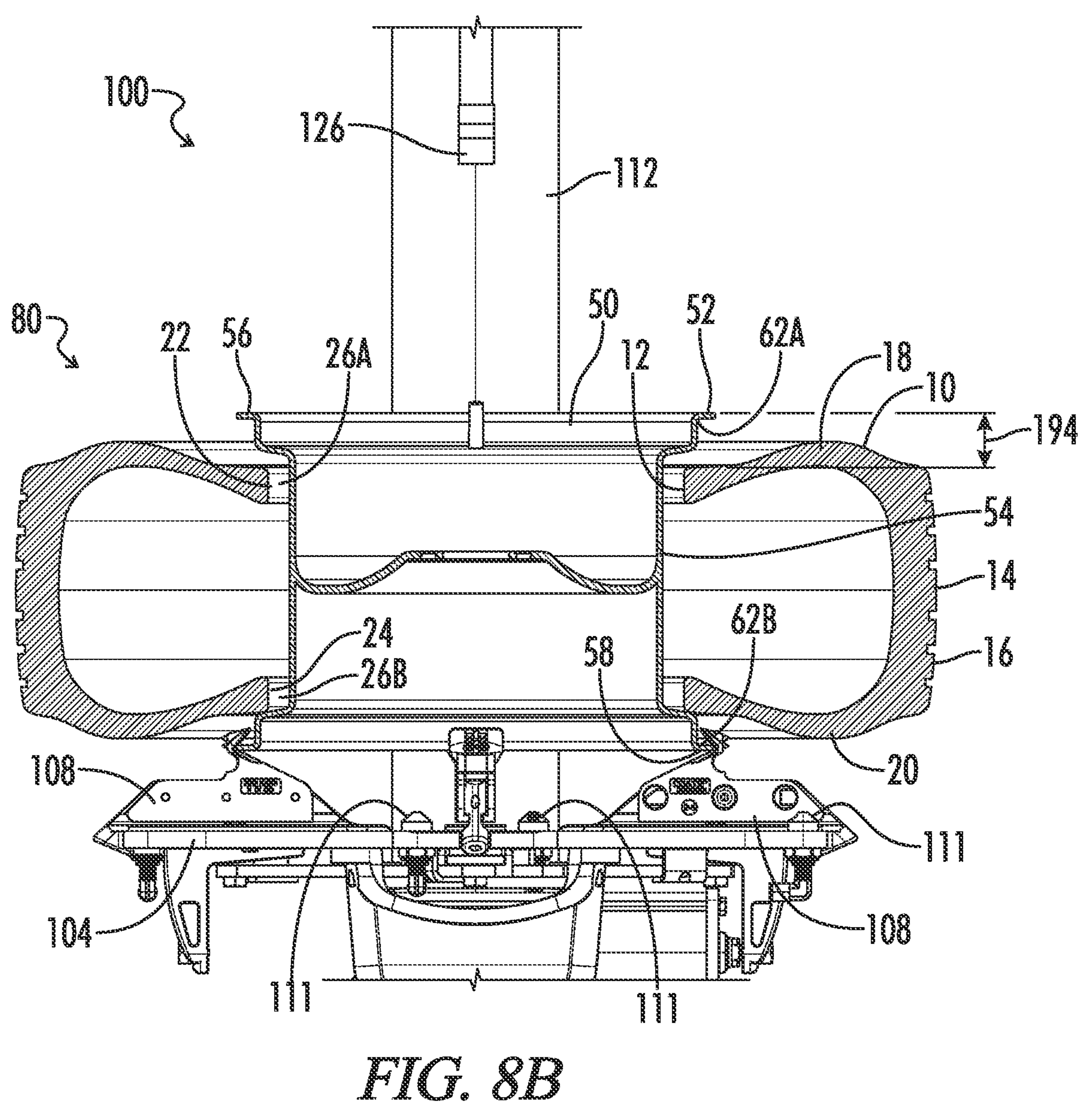
FIG. 8B is a cross-sectional view of the tire changing machine of FIG. 1 and the tire-wheel assembly of FIG. 2A taken along line 8B-8B of FIG. 8A.

FIGS. 8A-8B illustrate the tire-wheel assembly 80 in the mounted configuration with no external support. FIG. 8A is a perspective view and FIG. 8B is a cross-sectional view of the tire-wheel assembly 80 in the mounted configuration and secured to the tire changing assembly 100. Thus, the arm 130 does not engage the tire 10 in FIGS. 8A-8B. The second wheel edge 58 of the wheel 50 contacts the second sidewall 20 of the tire 10 and forces the second inner edge 24 upward. A first distance between the first wheel edge 56 of the wheel 50 and the first inner edge 22 of the tire 10 is generally designated by the number 194. When distance 194 is substantial, sealing the first bead 26A of the tire 10 into the first lip 62A of the wheel 50 may be difficult. Conventional tire changing machines are not able to seal the first bead 26A of the tire 10 into the first lip 62A of the wheel 50 without human operator intervention when distance 194 is substantial.

Figure 9A:
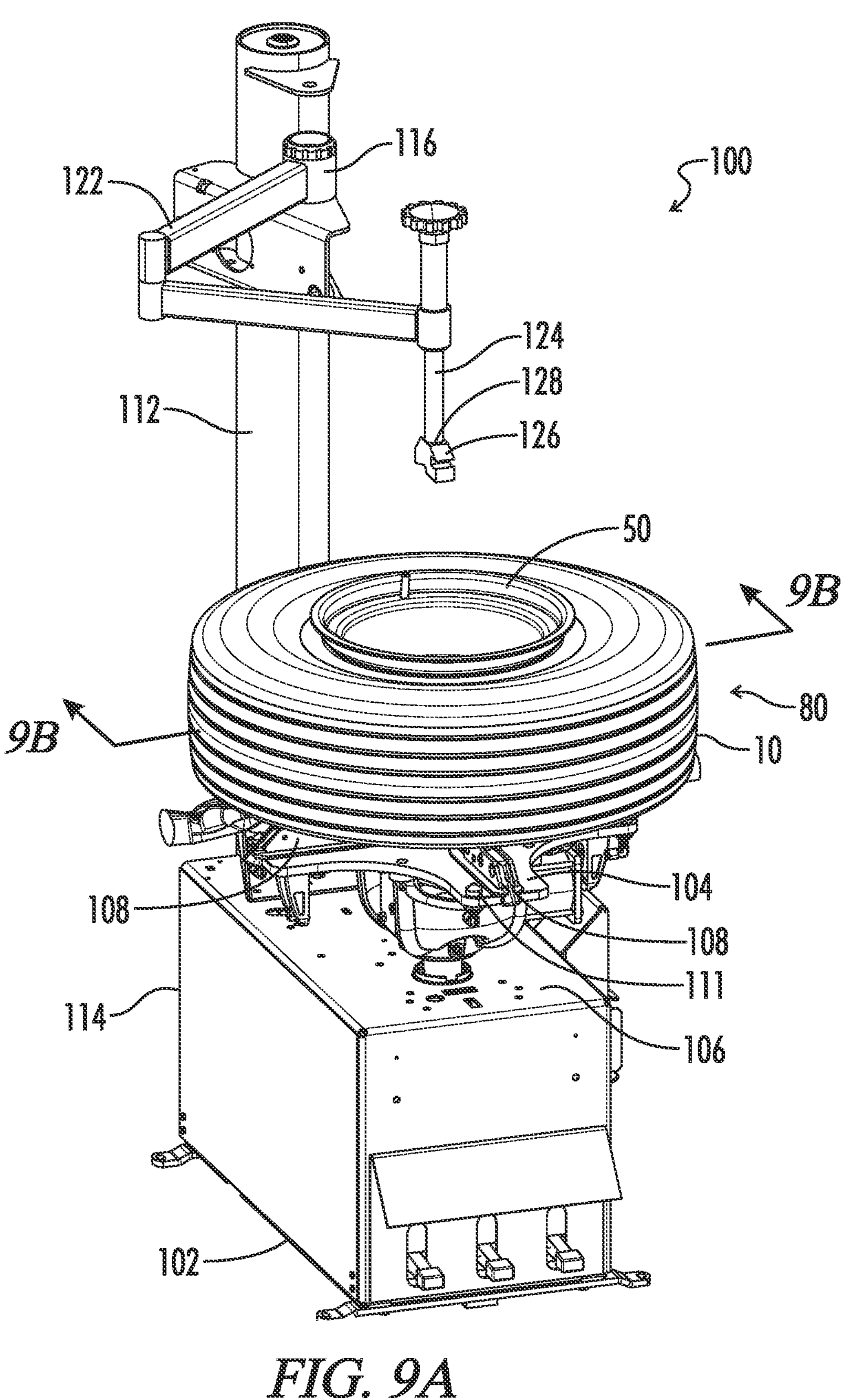
FIG. 9A is a perspective view of the tire changing machine of FIG. 1 with the arm removed and the tire changing machine supporting the tire-wheel assembly of FIG. 2A. A human operator is shown lifting the tire of the tire-wheel assembly of FIG. 2A.
Figure 9B:
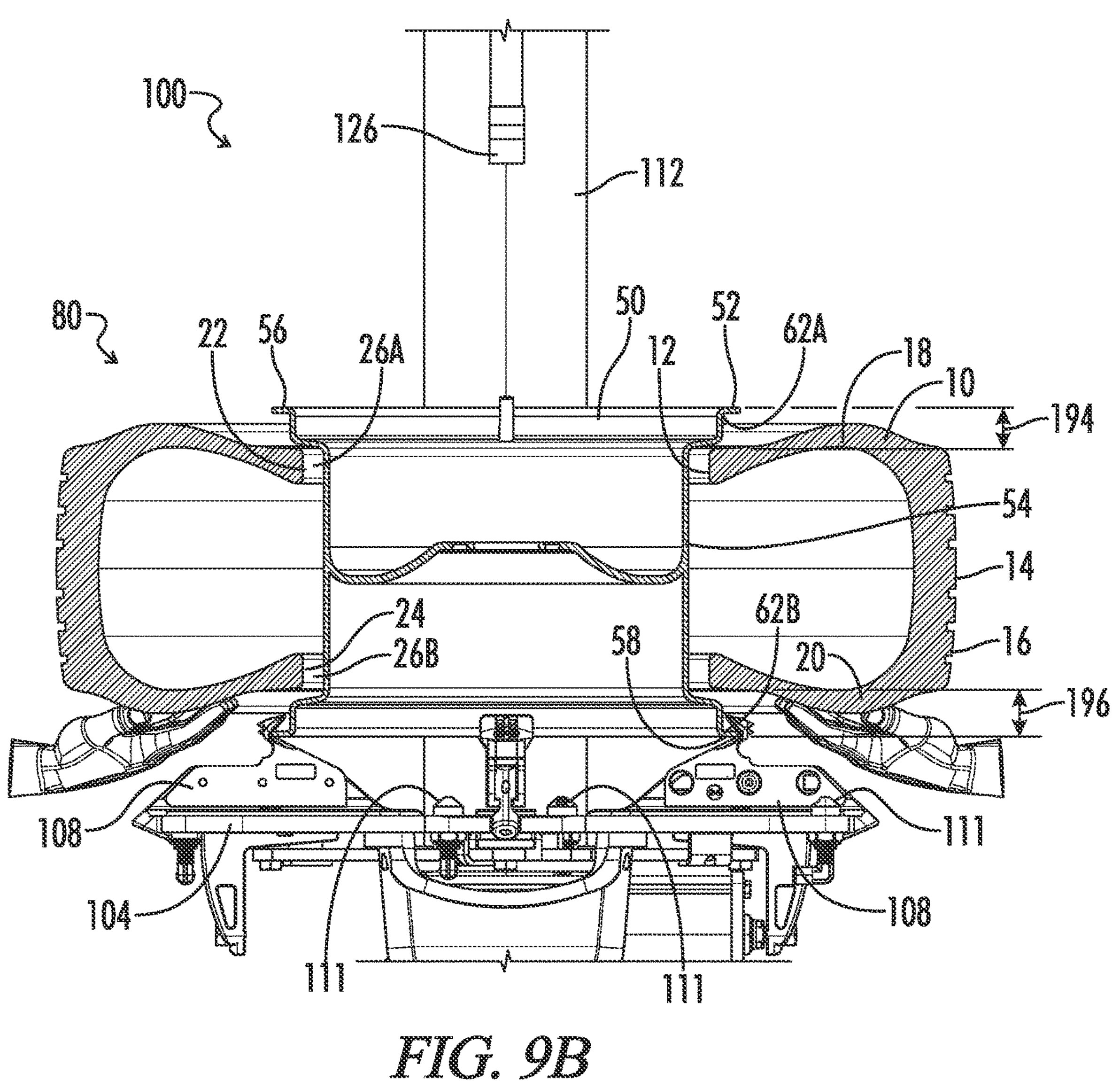
FIG. 9B is a cross-sectional view of the tire changing machine of FIG. 1 and the tire-wheel assembly of FIG. 2A taken along line 9B-9B of FIG. 9A. The human operator is shown lifting the tire of the tire-wheel assembly of FIG. 2A.

FIGS. 9A-9B illustrate the tire-wheel assembly 80 in the mounted configuration with external support provided by the human operator. FIG. 9A is a perspective view and FIG. 9B is a cross-sectional view of the tire-wheel assembly 80 in the mounted configuration and secured to the tire changing assembly 100 with external support provided by the human operator. The human operator lifts the tire 10 from either the first or second sidewall 18,20, whichever is closest to the turntable 104. In FIGS. 9A-9B the second sidewall 20 is shown closest to the turntable 104. By lifting the tire 10, the distance 194 between the first wheel edge 56 of the wheel 50 and the first inner edge 22 of the tire 10 is decreased, thus easing the difficulty of sealing the first bead 26A of the tire 10 into the first lip 62A of the wheel 50. However, the human operator lifting the tire 10 by contacting the second sidewall 20 forces the second inner edge 24 upward. Thus, a distance between the second wheel edge 58 of the wheel 50 and the second inner edge 24 of the tire 10, generally designated by the number 196, increases when the human operator lifts the tire 10. When distance 196 is substantial, sealing the second bead 26B of the tire 10 into the second lip 62B of the wheel 50 may be difficult.

Figure 10A:
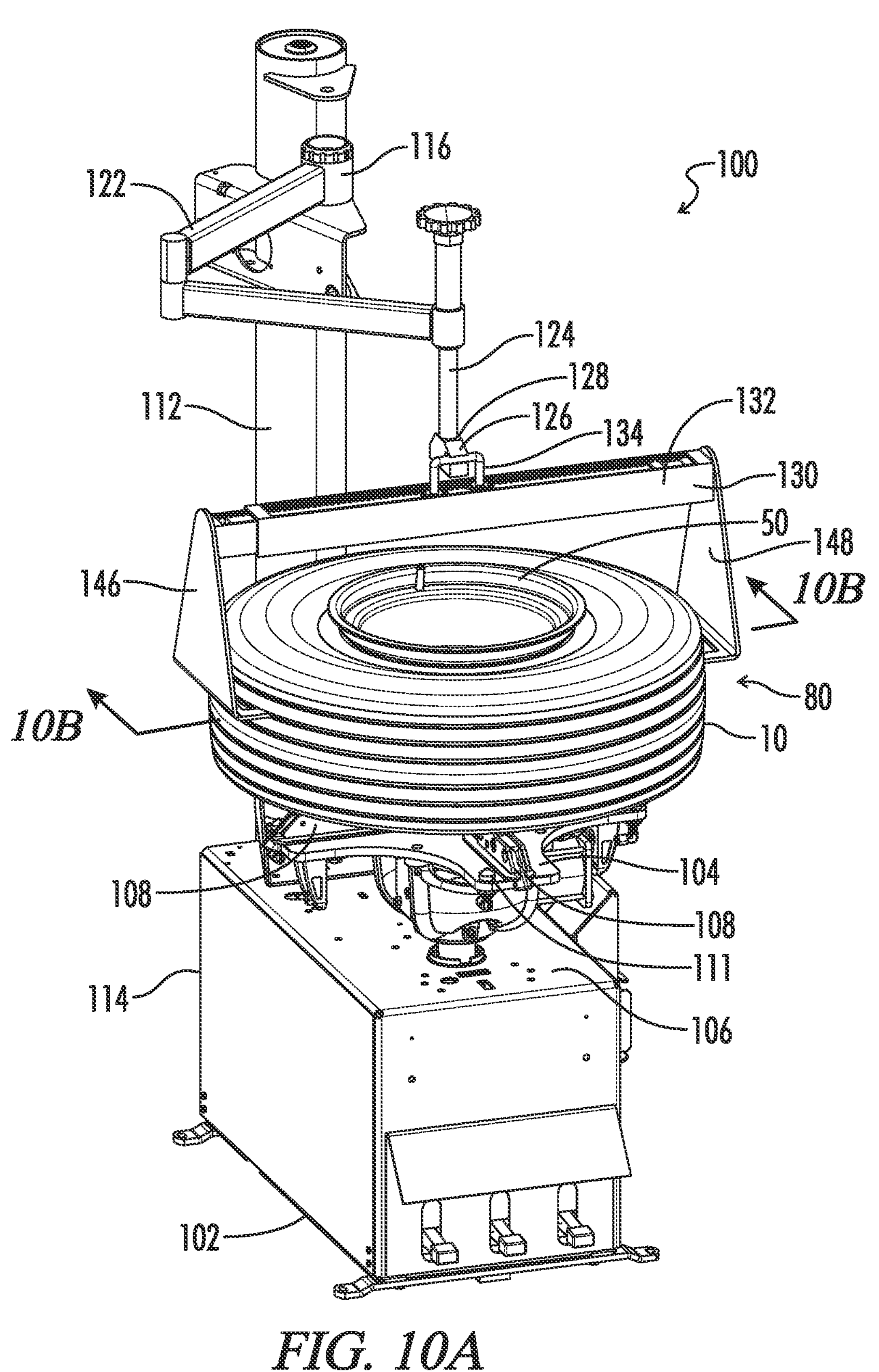
FIG. 10A is a perspective view of the tire changing machine of FIG. 1 and the tire changing machine supporting the tire-wheel assembly of FIG. 2A. The arm is shown lifting the tire of the tire-wheel assembly of FIG. 2A.
Figure 10B:
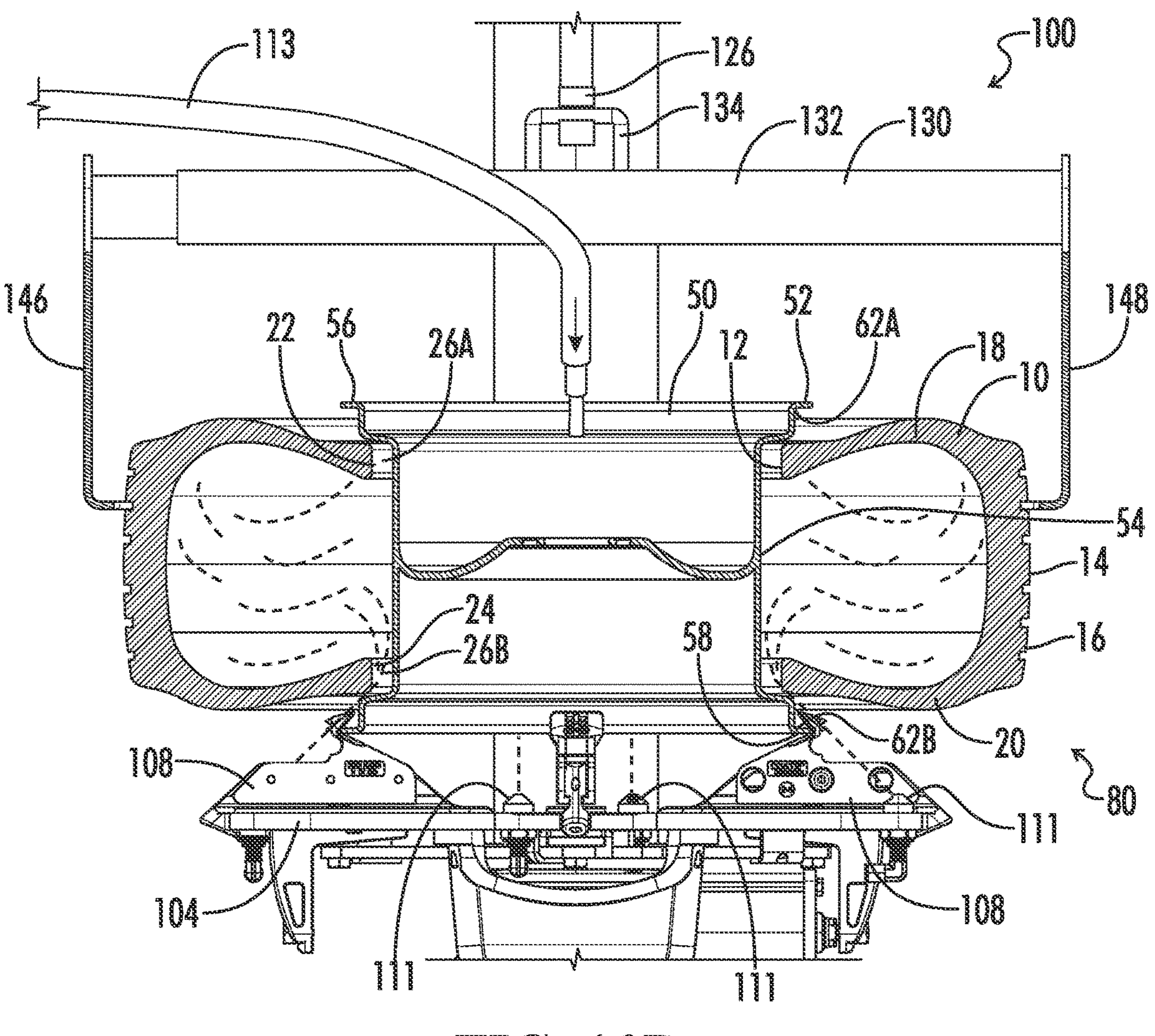
FIG. 10B is a cross-sectional view of the tire changing machine of FIG. 1 and the tire-wheel assembly of FIG. 2A taken along line 10B-10B of FIG. 10A. The arm is shown lifting the tire of the tire-wheel assembly of FIG. 2A.

FIGS. 10A-10B illustrate the tire-wheel assembly 80 in the mounted configuration with external support provided by the arm 130. FIG. 10A is a perspective view and FIG. 10B is a cross-sectional view of the tire-wheel assembly 80 in the mounted configuration and secured to the tire changing assembly 100 with external support provided by the arm 130. The arm 130 lifts the tire 10 by engaging the tread portion 16 of the tire 10. By lifting the tire 10, the distance 194 between the first wheel edge 56 of the wheel 50 and the first inner edge 22 of the tire 10 is decreased, thus easing the difficulty of sealing the first bead 26A of the tire 10 into the first lip 62A of the wheel 50. Further, by lifting the tire 10 by engaging the tread portion 16 rather than the second sidewall 20, the second inner edge 24 is not forced upward because the second sidewall 20 has no external pressure on it. The first and second sidewall 18,20 are thud allowed greater flexibility. The distance 196 between the second wheel edge 58 of the wheel 50 and the second inner edge 24 of the tire 10 is minimized when the arm 130 lifts the tire 10. The second inner edge 24 of the tire 10 may fall toward the second wheel edge 58 of the wheel 50 under the force of gravity. In some tire-wheel assemblies 80, the second inner edge 24 of the tire 10 may remain in contact with the second wheel edge 58 of the wheel 50 when the tire 10 is lifted by the arm 130. In other tire-wheel assemblies 80, the second inner edge 26 of the tire 10 may separate from the second wheel edge 58 of the wheel 50 when the tire 10 is lifted by the arm 130. However, distance 196 is less when the tire 10 is lifted by the arm 130 than when the tire 10 is lifted by the human operator. FIG. 10B includes dashed lines representative of streams of air being blasted between the second inner edge 26 of the tire 10 and the second wheel edge 58 of the wheel 50.

Figure 11A:
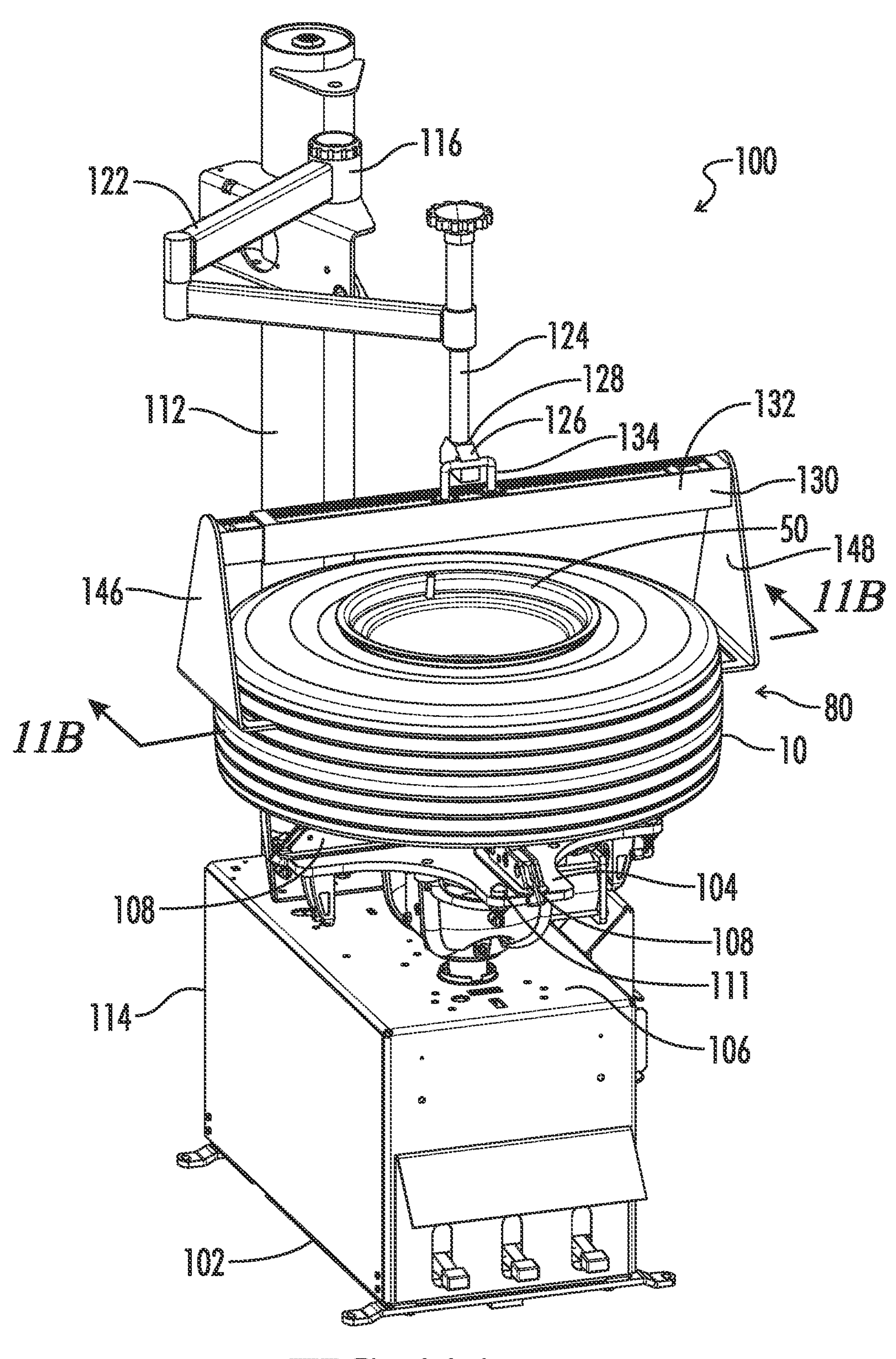
FIG. 11A is a perspective view of the tire changing machine of FIG. 1 and the tire changing machine supporting the tire-wheel assembly of FIG. 2A. The tire-wheel assembly is shown in a sealed configuration.
Figure 11B:
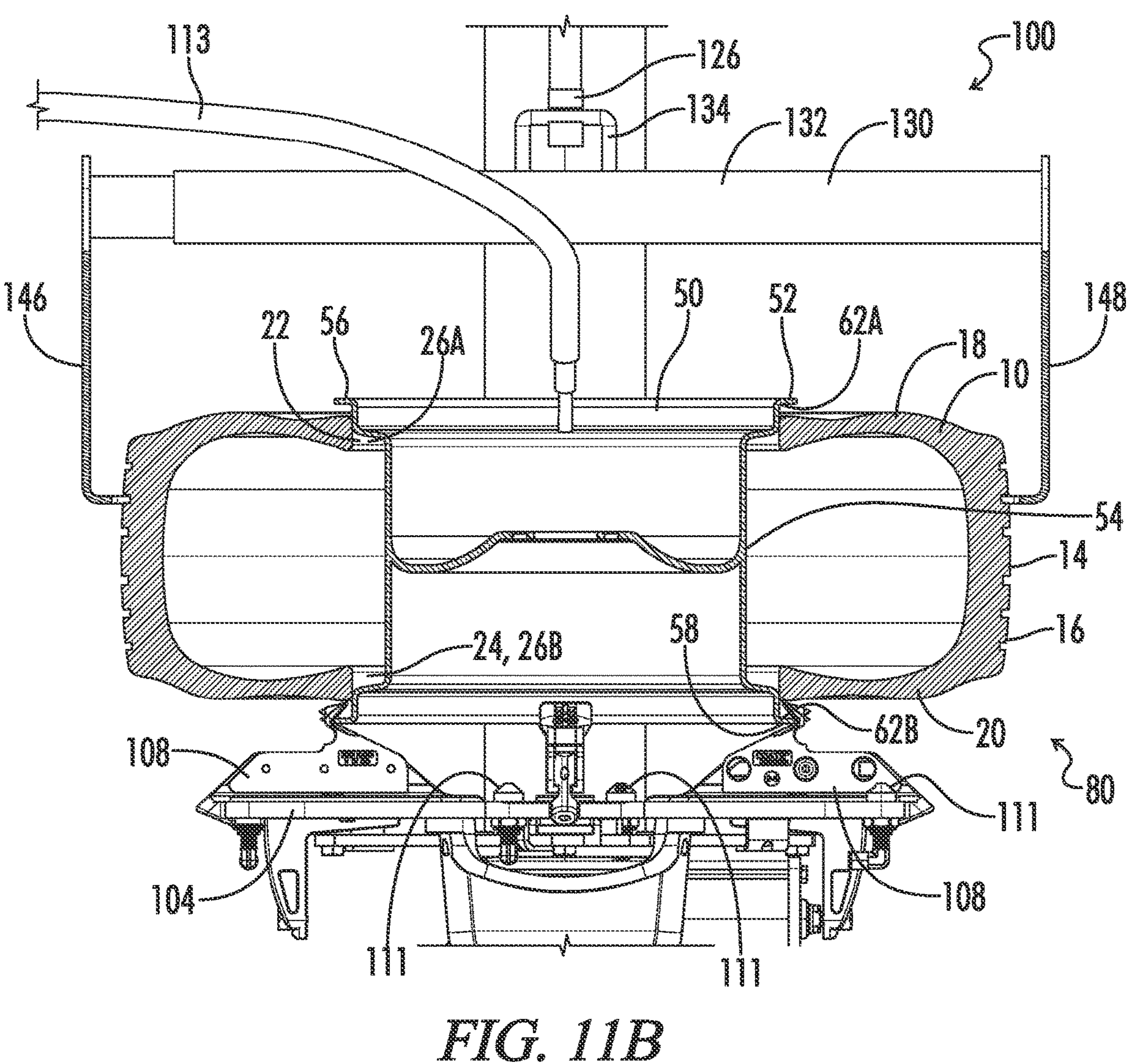
FIG. 11B is a cross-sectional view of the tire changing machine of FIG. 1 and the tire-wheel assembly of FIG. 2A taken along line 11B-11B of FIG. 11A. The tire-wheel assembly is shown in the sealed configuration.

FIGS. 11A-11B illustrate the tire-wheel assembly 80 in the sealed configuration. FIG. 11A is a perspective view and FIG. 11B is a cross-sectional view of the tire-wheel assembly 80 in the sealed configuration and secured to the tire changing assembly 100. The first bead 26A of the tire 10 is sealed into the first lip 62A of the wheel 50. The second bead 26B of the tire 10 is sealed into the second lip 62B of the wheel 50. Once the bead 26 of the tire 10 is sealed into the lip 62 of the wheel 50, the human operator will typically disengage the jaws 108 from the wheel 50. Once the jaws 108 are disengaged, the tire 10 may be inflated with air.

Another aspect in accordance with the embodiments disclosed herein is a method of sealing a tire bead into a lip of a wheel. The method comprises providing the tire changing machine 100, as shown in FIG. 1, having the chassis base 102, the rotatable wheel holder 104, the tower 112, and the arm 130. The rotatable wheel holder 104 is operable to retain the wheel 50. The tower 112 includes the linear actuator 124. The linear actuator 124 includes the implement 126 on the lower end 128 of the linear actuator 124. The arm 130 includes the elongate portion 132, the coupler 134 at the central portion 136 of the elongate portion 132 operable to couple the arm 130 to the implement 126 of the linear actuator 124, and first and second claws 146,148 coupled to the elongate portion 132 of the arm 130 and operable to engage the trade portion 16 of the tire 10. The arm 130 may be any embodiment of the arm disclosed herein or an equivalent.

The method further comprises providing the tire-wheel assembly 80 comprising the tire 10 loosely mounted to the wheel 50, also referred to as being in the mounted configuration. As previously discussed, the tire-wheel assembly 80 is in the mounted configuration when the first and second inner edges 22,24 of the tire 10 are entirely between the first and second wheel edges 56,68. However, in the mounted configuration, the beads 26 of the tire 10 are not sealed in the lips 62 of the wheel 50.

The method further comprises positioning the tire-wheel assembly 80 on the rotatable wheel holder 104, as illustrated in FIG. 3. When the tire-wheel assembly 80 is positioned on the rotatable wheel holder 104, the plurality of jaws 108 engage the wheel 50. The second wheel edge 58 of the wheel 50 contacts the second sidewall 20 of the tire 10 and forces the second inner edge 24 upward.

The method further comprises engaging the tread portion 16 of the tire 10 with the first and second claws 146,148 of the arm 130 and supporting the tire 10 at the tread portion 16 with the first and second claws 146,148. This is illustrated in FIGS. 10A-10B. By lifting the tire 10, the distance 194 between the first wheel edge 56 of the wheel 50 and the first inner edge 22 of the tire 10 is decreased, thus easing the difficulty of sealing the first bead 26A of the tire 10 into the first lip 62A of the wheel 50. Further, by lifting the tire 10 by engaging the tread portion 16, the second inner edge 24 is not forced upward. Thus, the distance 196 between the second wheel edge 58 of the wheel 50 and the second inner edge 24 of the tire 10 is minimized when the arm 130 lifts the tire 10. In some tire-wheel assemblies 80, the second inner edge 24 of the tire 10 may remain in contact with the second wheel edge 58 of the wheel 50 when the tire 10 is lifted by the arm 130. In other tire-wheel assemblies 80, the second inner edge 26 of the tire 10 may separate from the second wheel edge 58 of the wheel 50 when the tire 10 is lifted by the arm. However, distance 196 is less when the tire 10 is lifted by the arm 130 than when the tire 10 is lifted by the human operator.

The method further comprises directing air between the lip 62 of the wheel 50 and the tire 10. To seal the bead 26 of the tire 10 into the lip 62 of the wheel 50, the tire-wheel assembly 80 is secured to the turntable 104 and the tire wheel assembly 80 is placed in the mounted configuration. The valve stem inflation hose 113 is coupled to the valve stem of the tire 10. The valve stem inflation hose 113 continuously expels air into an interior chamber of the tire 10. The human operator then causes the plurality of nozzles 111 to expel a blast of air. The plurality of nozzles 111 direct the blast of air between the bead 26 of the tire 10 and the lip 62 of the wheel. In reference to the position of the tire-wheel assembly 80 in FIG. 8A-11B, the plurality of nozzles 111 direct the blast of air between the second inner edge 24, and thus the second bead 26B, of the tire 10 and the second wheel edge 58, and thus the second lip 62B, of the wheel 50.

One advantage of the present invention may be that it allows a single human operator to seal the bead 62 of the tire 10 into the lip 62 of the wheel 50, even for tire-wheel assemblies 80 that are difficult to seal, without assistance from a second human operator. Another advantage may be that the second human operator is no longer required to do any heavy lifting and is able to keep their fingers away from the gap between the bead 26 of the tire 10 and the lip 62 of the wheel where the fingers could be pinched. Another advantage may be that the first and second sidewalls 18,20 are allowed more flexibility when the tire 10 is engaged by the arm than the when the tire 10 is not engaged by an external force or is engaged by a human operator. Another advantage may be that the arm 130 is adjustable such that it accommodates a variety of outer circumferences 14 of tires 10. Another advantage may be that the arm 130 is self-centering when engaging the tire 10.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A tire changing machine, comprising:

a chassis base;

a rotatable wheel holder operable to retain a wheel rim;

a tower extending upward from the chassis base, the tower carrying a linear actuator attached to the tower via a pivoting arm assembly, the linear actuator including an implement on a lower end of the linear actuator;

an arm including an elongate portion, a coupler at a central portion of the elongate portion operable to couple the arm to the implement of the linear actuator, the arm further including a telescopic portion having first and second ends, a center member defining the central portion, a first outer member extending from the central portion to the first end, a second outer member extending from the central portion to the second end, a first claw coupled to the first end of the telescopic portion of the arm, and a second claw coupled to the second end of the telescopic portion of the arm, the first and second claws being operable to engage a tread portion of a tire;

wherein the first outer member is configured to receive the center member and includes gear teeth, and the second outer member is configured to receive the first outer member and includes gear teeth; and wherein the coupler is connected to the center member and comprises a handle with first and second gears rotatably coupled to the handle, the first gear operable to engage the gear teeth of the first outer member, the second gear operable to engage the gear teeth of the second outer member.

2. The tire changing machine of claim 1, wherein:

the coupler forms a looped handle extending away from the arm and operable to receive the implement of the linear actuator.

3. The tire changing machine of claim 1, wherein:

the linear actuator comprises a hydraulic cylinder.

4. The tire changing machine of claim 1, wherein:

the linear actuator comprises an electrically powered linear actuator.

5. The tire changing machine of claim 1, wherein:

each of the first and second claws includes an attachment portion operable to couple the claw to the elongate portion of the arm, an extension portion coupled to the attachment portion and oriented substantially perpendicular to the elongate portion of the arm, and a grip portion coupled to the extension portion and operable to engage the tread portion of the tire.

6. The tire changing machine of claim 5, wherein:

the grip portion includes a tire engagement edge having a curvature with a circumference similar to a circumference of the tread portion of the tire.

7. A tire changing tool, comprising:

an arm including an elongate portion including a telescopic portion having a center member, a first outer member, a second outer member, the first outer member extending from the central portion to a first end of the arm, and the second outer member extending from the central portion to a second end of the arm;

a first claw coupled to the first outer member of the arm;

a second claw coupled to the second outer member of the arm;

wherein the first and second claws are operable to engage a tread portion of a tire;

wherein the first outer member is configured to receive the center member and includes gear teeth, and the second outer member is configured to receive the first outer member and includes gear teeth; and wherein the tire changing tool further includes a coupler connected to the center member that comprises a handle with first and second gears rotatably coupled to the handle, the first gear operable to engage the gear teeth of the first outer member, the second gear operable to engage the gear teeth of the second outer member.

8. The tire changing machine of claim 7, wherein:

each of the first and second claws includes an attachment portion operable to couple the claw to the elongate portion of the arm, an extension portion coupled to the attachment portion and oriented substantially perpendicular to the elongate portion of the arm, and a grip portion coupled to the extension portion and operable to engage the tread portion of the tire.

9. The tire changing machine of claim 8, wherein:

the grip portion includes a tire engagement edge having a curvature with a circumference similar to a circumference of the tread portion of the tire.

10. A method of sealing a tire bead into a lip of a wheel, the method comprising:

providing a tire changing machine having a chassis base, a rotatable wheel holder operable to retain a wheel, a tower including a linear actuator having an implement on a lower end of the linear actuator, and an arm including an elongate portion, a coupler at a central portion of the elongate portion operable to couple the arm to the implement of the linear actuator, the elongate portion comprising a telescopic portion having a center member defining the central portion, a first outer member, a second outer member, the first outer member extending from the central portion to a first end of the arm, and the second outer member extending from the central portion to a second end of the arm; and first and second claws coupled to the first and second ends of the elongate portion of the arm, respectively, and operable to engage a tread portion of a tire;

wherein the first outer member is configured to receive the center member and includes gear teeth, and the second outer member is configured to receive the first outer member and includes gear teeth; and wherein the tire changing machine further includes a coupler connected to the center member and comprises a handle with first and second gears rotatably coupled to the handle, the first gear operable to engage the gear teeth of the first outer member, the second gear operable to engage the gear teeth of the second outer member the method further comprising:

providing a tire-wheel assembly comprising a tire loosely mounted to a wheel;

positioning the tire-wheel assembly on the rotatable wheel holder;

engaging the tread portion of the tire with the first and second claws;

supporting the tire at the tread portion with the first and second claws; and directing air between the lip of the wheel and the tire.

* * * * *